(12) United States Patent
Mamba

(10) Patent No.: US 8,148,931 B2
(45) Date of Patent: Apr. 3, 2012

(54) MULTI-DEGREE-OF-FREEDOM STAGE CONTROL SYSTEM

(75) Inventor: Takashi Mamba, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 292 days.

(21) Appl. No.: 12/686,386

(22) Filed: Jan. 13, 2010

(65) Prior Publication Data

US 2010/0109593 A1     May 6, 2010

Related U.S. Application Data

(63) Continuation of application No. PCT/JP2008/062101, filed on Jul. 3, 2008.

(30) Foreign Application Priority Data

Jul. 25, 2007    (JP) .................. 2007-193720

(51) Int. Cl.
  *G05B 11/32* (2006.01)
(52) U.S. Cl. ................. 318/625; 318/626; 318/567
(58) Field of Classification Search .............. 318/625, 318/626, 135, 567, 569, 568.12; 901/47
  See application file for complete search history.

(56) References Cited

U.S. PATENT DOCUMENTS 8,044,541 B2 * 10/2011 Toyota et al. .............. 310/12.05

FOREIGN PATENT DOCUMENTS

| JP | 05-053622 | 3/1993 |
| JP | 2001-159901 | 6/2001 |
| JP | 2006-072398 | 3/2006 |

* cited by examiner

*Primary Examiner* — Karen Masih
(74) *Attorney, Agent, or Firm* — Ditthavong Mori & Steiner, P.C.

(57) ABSTRACT

There are included a plurality of actuators, an instruction generator for generating instructions of plural degrees of freedom, a position arithmetic unit for calculating positions of plural degrees of freedom from signals of a plurality of sensors, a control arithmetic unit for calculating operation amounts of plural degrees of freedom from the instructions of plural degrees of freedom and the positions of plural degrees of freedom, a thrust force conversion arithmetic unit for calculating thrust force instructions of the plurality of actuators from the operation amounts of the plural degrees of freedom, a current instruction unit for calculating current instructions which should be flowed to the plurality of actuators, and a sensor configuration input device for selecting a desired sensor configuration from among a plurality of sensor configurations. The positions of plural degrees of freedom are calculated by using a position arithmetic expression corresponding to a selected sensor configuration.

14 Claims, 10 Drawing Sheets

US 8,148,931 B2

MULTI-DEGREE-OF-FREEDOM STAGE CONTROL SYSTEM

CROSS-REFERENCE TO RELATED APPLICATIONS

The present application is a continuation application of PCT/JP2008/062101, filed Jul. 3, 2008, which claims priority to Japanese Patent Application No. 2007-193720, filed Jul. 25, 2007. The contents of these applications are incorporated herein by reference in their entirety.

BACKGROUND OF THE INVENTION

Field of the Invention

The present invention relates to a system for controlling a multi-degree-of-freedom stage.

In a conventional multi-degree-of-freedom stage control apparatus, a dedicated system described in Japanese Laid-open Patent Publication No. 2001-159901 and Japanese Laid-open Patent Publication No. 2006-72398 has been developed in accordance with a sensor configuration and an actuator configuration of a multi-degree-of-freedom stage that becomes a control object.

A conventional multi-degree-of-freedom stage control system does not equipped with a sensor configuration input device for selecting a position arithmetic expression matched with a sensor configuration of a control object and an actuator configuration input device for selecting an actuator thrust force conversion arithmetic expression matched with an actuator configuration of a control object, and a dedicated position calculation operation and a dedicated actuator thrust force conversion calculation operation are executed.

SUMMARY OF THE INVENTION

According to one aspect of the present invention, there are included a multi-degree-of-freedom stage structured by a plurality of actuators, an instruction generator for generating instructions of plural degrees of freedom, a position arithmetic unit for calculating positions of plural degrees of freedom from signals of a plurality of sensors attached to a control object, a control arithmetic unit for calculating operation amounts of plural degrees of freedom from the instructions of plural degrees of freedom and the positions of plural degrees of freedom, a thrust force conversion arithmetic unit for calculating thrust force instructions of the plurality of actuators from the operation amounts of the plural degrees of freedom, a current instruction unit for calculating current instructions which should be flowed to the plurality of actuators, and a sensor configuration input device for selecting a desired sensor configuration from among a plurality of sensor configurations. The positions of plural degrees of freedom are calculated by using a position arithmetic expression corresponding to a selected sensor configuration.

BRIEF DESCRIPTION OF THE DRAWINGS

A more complete application of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
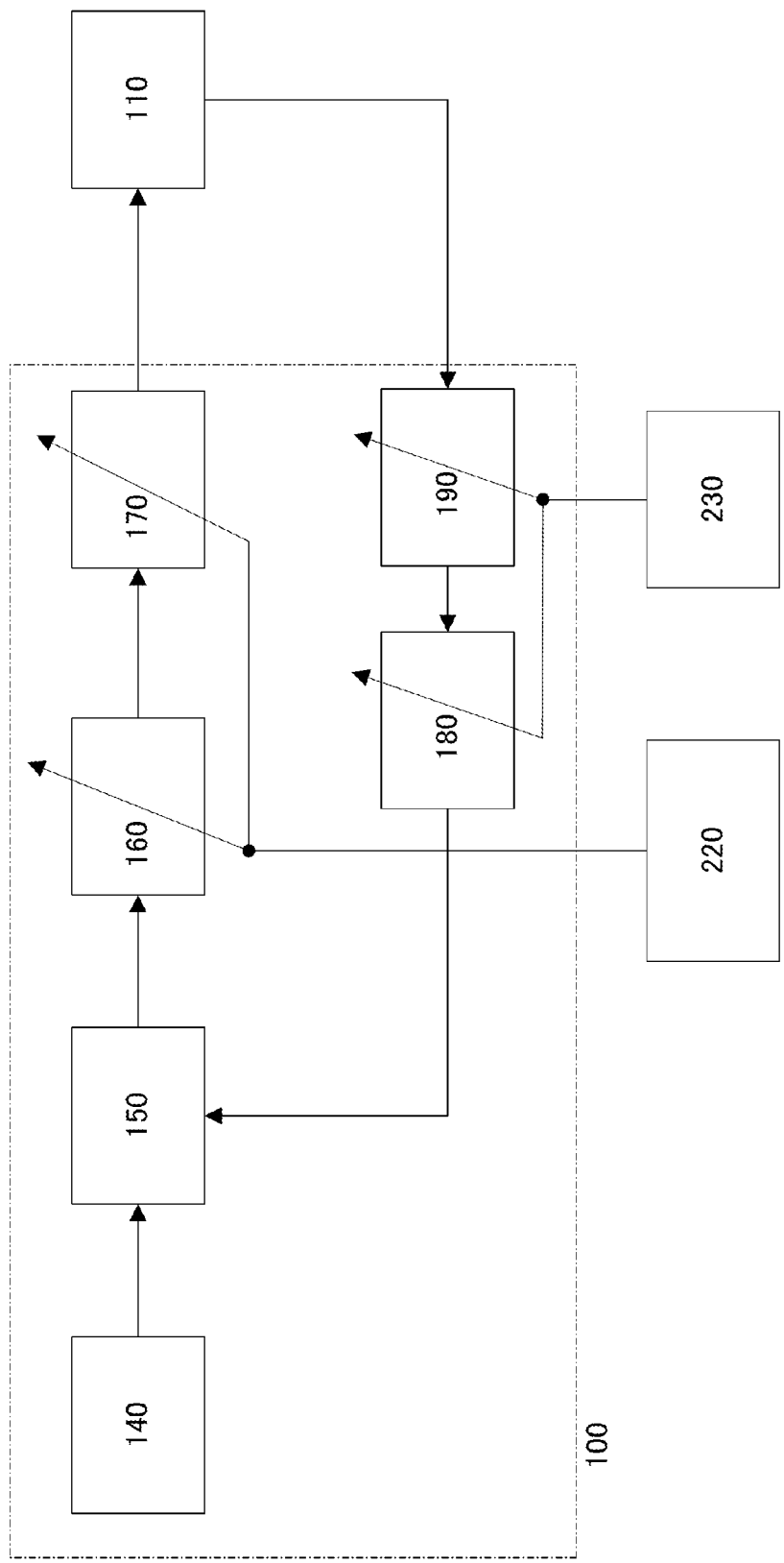
FIG. 1 is a block diagram of a multi-degree-of-freedom stage control apparatus according to an embodiment.

Embodiments will now be described with reference to the accompanying drawings, wherein like reference numerals designate corresponding or identical elements throughout the various drawings.

FIG. 1 is a block diagram of a multi-degree-of-freedom stage control apparatus according to an embodiment. In FIG. 1, a multi-degree-of-freedom stage control apparatus 100 consists of at least an instruction generator 140, a control arithmetic unit 150, a thrust force arithmetic unit 160, a current instruction unit 170, a sensor signal converter 190, and a position arithmetic unit 180. The instruction generator 140 provides instructions of the position and the posture of a multi-degree-of-freedom stage 110. The position instruction is provided by six degrees-of-freedom in which the position in X axis, Y axis, and Z axis directions and the posture of rolling, pitching, and yawing are mixed. The position instruction is generated by a compliment for every control cycle on the basis of a positioning command provided by the user, or a predetermined operation is provided as the position instruction for every control cycle. The sensor signal convertor 190 receives a sensor signal and calculates a sensor position expressed by an absolute coordination. The position arithmetic unit 180 calculates the position and the posture of the multi-degree-of-freedom stage 11 by using the sensor position information calculated by the sensor signal convertor 190. The control arithmetic unit 150 determines an operation amount such that the position and the posture calculated by the position arithmetic unit 180 follow the instruction generated by the position arithmetic unit 140. Specifically, the operation amount includes, for example, a translation thrust force of the barycentric position and a moment around the barycentric position. The six degrees-of-freedom of X axis, Y axis, Z axis, rolling, pitching, and yawing are controlled by a position PID control, a cascade control of a position PI control/speed P control, a cascade control of a position P control/speed PI control, or the like, and a techniques such as a feed forward control, a first order lag filter, a notch filter, and the like are used. The instruction generated by the instruction generator 140 may be a speed instruction, and the control arithmetic unit 150 may be a speed control system that calculates the amount corresponding to the differential of the position and the posture and determines the operation amount such that the differential substantial amounts of the position and the posture follow the instruction. The thrust force conversion arithmetic unit 160 calculates the thrust force that each actuator should output in order to provide the operation amount calculated by the control arithmetic unit 150. The current instruction unit 170 controls an actuator current of the multi-degree-of-freedom stage 110 to generate a thrust force corresponding to the thrust force instruction received from the thrust force conversion arithmetic unit 160.

The user of the control apparatus inputs an actuator configuration of the multi-degree-of-freedom stage 110 by using an actuator configuration input device 220. The thrust force conversion arithmetic unit 160 is structured so that an arithmetic expression is changed in accordance with the input actuator configuration. The current instruction unit 170 is structured so that an arithmetic expression is changed in accordance with the input actuator configuration. The user of the control apparatus input a sensor configuration of the multi-degree-of-freedom stage 110 by using a sensor configuration input device 230. The sensor signal convertor 190 is structured so that an arithmetic expression is changed in accordance with the input sensor configuration. The position arithmetic unit 180 is structured so that an arithmetic expression is changed in accordance with the input sensor configuration.

Figure 2:
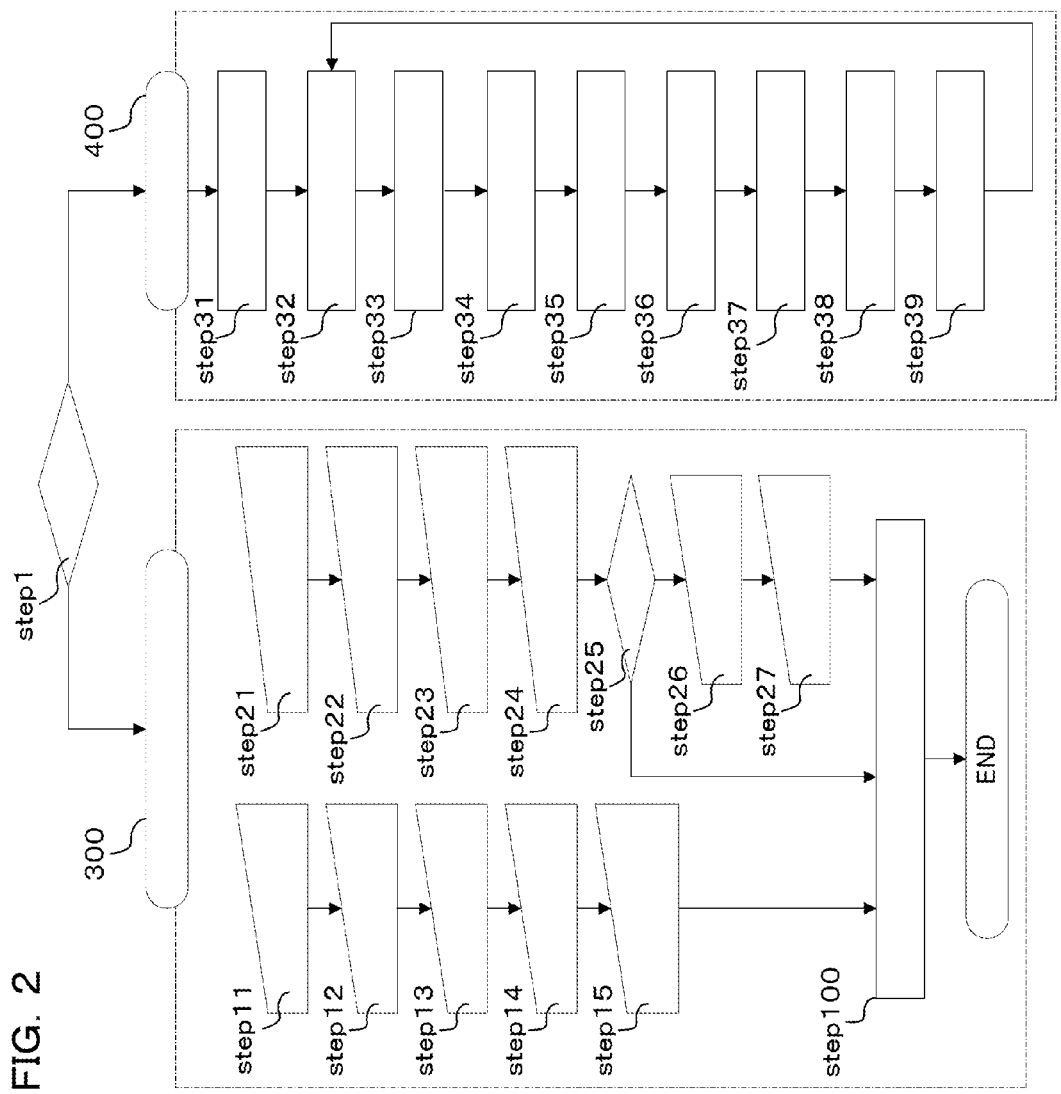
FIG. 2 is a flow chart showing an operation of the multi-degree-of-freedom stage control apparatus according to the embodiment.

FIG. 2 is a flow chart showing an operation of the multi-degree-of-freedom stage control apparatus of the embodiment. Hereinafter, the operation will be described with reference to FIG. 2. The multi-degree-of-freedom stage control apparatus is equipped with a memory such as a flash memory, a hard disc, or the like, and is constituted so that labor hour of inputting the configurations for every activation is omitted by storing the actuator configuration and the sensor configuration input by the user. Herein, a control preliminary preparation mode 300 for inputting the actuator configuration and the sensor configuration and a control mode 400 for actually executing a control calculation by a predetermined control cycle are prepared. First, the user inputs and stores the actuator configuration and the sensor configuration in the control preliminary preparation mode 300 just one time. Then the user can activate the apparatus by the control mode 400.

When the multi-degree-of-freedom stage control apparatus is activated, first, whether the mode is the control preliminary preparation mode 300 or the control mode 400 is judged. The judgment may be executed by displaying a screen for a mode selection on a monitor and asking the user for input, by switching the modes by a hardware such as a dip switch, or by having a storage device such as a flash memory, a hard disc, or the like and by switching the modes by a software flag. When using the apparatus at the first time, activation is executed by the control preliminary preparation mode 300. In the control preliminary preparation mode 300, the actuator configuration and the sensor configuration are input. The actuator configuration indicates the number of actuators, and position and the type of the each of the actuators. The sensor configuration indicates the number of sensors, and the position and the type of each of the sensors. In the control preliminary preparation mode 300, first, the sensor configuration is input. First, the number of sensors is input in step 12. The number of sensors is input for each of X axis, Y axis, and Z axis. Next, a sensor position is input in step 12. The absolute position of X coordinate, Y coordinate, and Z coordinate of the sensor detection point when the value in which an offset is added to a sensor signal becomes zero is input for each of the sensors input in step 11. However, the sensor offset is input in the following step 15. Next, a sensor type is selected in step 13. In the selection of the sensor type, an absolute position sensor such as a capacitance sensor, an absolute value encoder, or the like, or a relative position sensor in which an activation position is zero such as an incremental linear scale, a laser interferometer, or the like is selected. In the case of relative position sensor, in the control mode 400, the stage is controlled by using relative position information in which the activation position is zero right after activation, and a reset operation is executed. In the reset operation, a sensor signal when a zero position signal is detected is stored. After the reset operation is completed, the relative position sensor can be managed similarly to an absolute position sensor by subtracting the sensor signal when a zero position signal is detected from an actual sensor signal. Next, a sensor sensitivity is input in step 14 and a sensor offset is input in step 15.

Next, the actuator configuration is input. First, the number of actuators is input in step 21. The number of actuators is input for each of X axis, Y axis, and Z axis. Next, an actuator position is input in step 22. The actuator position is input by X coordinate, Y coordinate, and Z coordinate of a thrust force center point for each of the actuators input in step 21. Next, an actuator type is selected in step 23. In the selection of the actuator type, for example, a voice coil motor or a linear motor is selected. In the case of the voice coil motor, since the relation between a current and a thrust force is approximately constant depending on the position, it is necessary to input only a thrust constant. In the case of a linear motor, since a current to be flowed have to be changed depending on the position, information of a pole pitch and a magnetic pole position are necessary. In step 24, a thrust constant is input. In step 25, when the actuator type is a bois coil motor, the operation goes to step 100, and when the actuator type is a linear motor, the operation goes to step 26. The pole pitch is input in step 26, and the magnetic pole position is input in step 27. In step 100, the setup is stored and the control preliminary preparation mode 300 is finished. When necessary, a flag is set so that activation is executed by the control mode 400 when activation is executed next time.

In the control mode 400, an initialization processing is executed in step 31. Herein, an initialization calculation is executed on the basis of information input in the control preliminary preparation mode 300. Specifically, the initialization calculation includes reading of a parameter, setting of an initial value of a variable, calculation of a variable for high speed calculation. Herein, when the number of actuators input in step 21 is one in X axis direction, two in Y axis direction, and three in Z axis direction, the following calculation is executed by the thrust force convertor 160 from the actuator position input in step 22. Assuming that the barycentric position is (xG, yG, zG), the position of an X axis actuator is (xx1, yx1, zx1), the positions of two Y axis actuators are respectively (xy1, yy1, zy1), (xy2, yy2, zy2), the positions of three Z axis actuators are respectively (xz1, yz1, zz1), (xz2, yz2, zz2), (xz3, yz3, zz3). Assuming that a thrust force of the X axis actuator is Fx1, thrust forces of two Y axis actuators are respectively Fy1, Fy2, and thrust forces of three Z axis actuators are respectively Fz1, Fz2, Fz3. Assuming that an X axis component, a Y axis component, a Z axis component of a translation thrust force of the barycentric position are respectively Fx, Fy, Fz, and an X axis component, a Y axis component, and a Z axis component of a moment around the barycenter are respectively Tx, Ty, Tz. In this case, expression (1) is satisfied.

$$\begin{bmatrix} F_z \\ T_x \\ T_y \\ F_x \\ F_y \\ T_z \end{bmatrix} =$$

$$\begin{bmatrix} 1 & 1 & 1 & 0 & 0 & 0 \\ y_{z1} - y_G & y_{z2} - y_G & y_{z3} - y_G & 0 & -(z_{y1} - z_G) & -(z_{y2} - z_G) \\ -(x_{z1} - x_G) & -(x_{x2} - x_G) & -(x_{z3} - z_G) & z_{x1} - z_G & 0 & 0 \\ 0 & 0 & 0 & 1 & 0 & 0 \\ 0 & 0 & 0 & 0 & 1 & 1 \\ 0 & 0 & 0 & -(y_{x1} - y_G) & x_{y1} - x_G & x_{y2} - x_G \end{bmatrix}$$

$$\begin{bmatrix} F_{z1} \\ F_{z2} \\ F_{z3} \\ F_{x1} \\ F_{y1} \\ F_{y2} \end{bmatrix}$$

Since the above expression is a square matrix and the inverse matrix can be obtained, when the inverse matrix is expressed by G, the following expression (2) can be obtained.

$$\begin{bmatrix} F_{z1} \\ F_{z2} \\ F_{z3} \\ F_{x1} \\ F_{y1} \\ F_{y2} \end{bmatrix} = G \begin{bmatrix} F_z \\ T_x \\ T_y \\ F_x \\ F_y \\ T_z \end{bmatrix}$$

Next, a sensor signal is read in step 32. Next, a sensor position is calculated from the sensor signal in step 33. Specifically, the sensor position (xw, yw, zw) when a sensor signal SX1 of an absolute position sensor that detects a value of X axis is detected is calculated by the following expression. Herein, the sensor position input in step 12 shall be (xl, yl, zl), and the sensor offset value input in step 15 shall be $S_{ofs}$, and the sensor sensitivity shall be K.

$$x_w = K(S_{X1} - S_{ofs}) + x_l$$

$$y_w = y_l$$

$$z_w = z_l$$

Next, a stage position is calculated in step 34. An arithmetic expression of the stage position is different depending on the sensor configuration. In the multi-degree-of-freedom stage control apparatus of the embodiment, all of position arithmetic expressions corresponding to the sensor configurations shown in FIG. 3 to FIG. 10 are stored in a memory. For example, a position arithmetic expression of the sensor configuration in the case where the input number of sensors is two for X axis, two for Y axis, and three for Z axis is used, or a position arithmetic expression of the sensor configuration in the case where the input number of sensors is one for X axis, two for Y axis, and three for Z axis is used. Then, in accordance with the selected sensor configuration, the positions and the postures are calculated for six degrees-of-freedom that is combination of the positions in X axis, Y axis, and Z axis, and the postures of roll, pitch, and yaw. Next, in step 35, a position instruction of the stage is calculated. Next, in step 36, a control operation similar to the conventional control operation is executed. Next, a thrust force convention operation is executed in step 37. In the thrust force conversion operation, the calculation of expression (2) is executed to obtain a thrust force instruction of each actuator by using the matrix G obtained in step 31. Next, in step 38, a current instruction operation is executed. In the current instruction operation, the thrust force instruction of each actuator is converted into a current instruction. For example, when the actuator type input in step 23 is a voice coil motor, the current instruction $i_{ref}$ is calculated by the following expression. Herein, the thrust constant input in step 24 shall be $K_{vcm}$.

$$i_{ref} = K_{vcm} f_{ref}$$

Further, for example, when the actuator type input in step 23 is a three phase linear motor, current instructions $i_{Uref}$, $i_{Vref}$, $i_{Wref}$ of phase U, phase V, and phase W are calculated by the following expressions. Herein, the thrust constant input in step 24 shall be $K_{lm}$, the pole pitch input in step 26 shall be $P_i$, and the magnetic pole position input in step 27 shall be $P_o$.

$$i_{Uref} = K_{lm} f_{ref} \cos((x - P_o)P_i)$$

$$i_{Uref} = K_{lm} f_{ref} \cos\left((x - P_o)P_i + \frac{2}{3}\pi\right)$$

$$i_{Wref} = K_{lm} f_{ref} \cos\left((x - P_o)P_i + \frac{4}{3}\pi\right)$$

Next, in step 39, the current instruction obtained in step 38 is output to a current amp of the multi-degree-of-freedom stage control apparatus 100. The multi-degree-of-freedom stage control apparatus 100 controls the current of each actuator on the basis of the received current instruction, and each actuator is operated by the generated thrust force. Next, the operation goes back to step 32, and the aforementioned calculation is repeated for each of a constant control cycle.

Concrete sensor configurations will be described below as for the aforementioned calculation.

Figure 3:
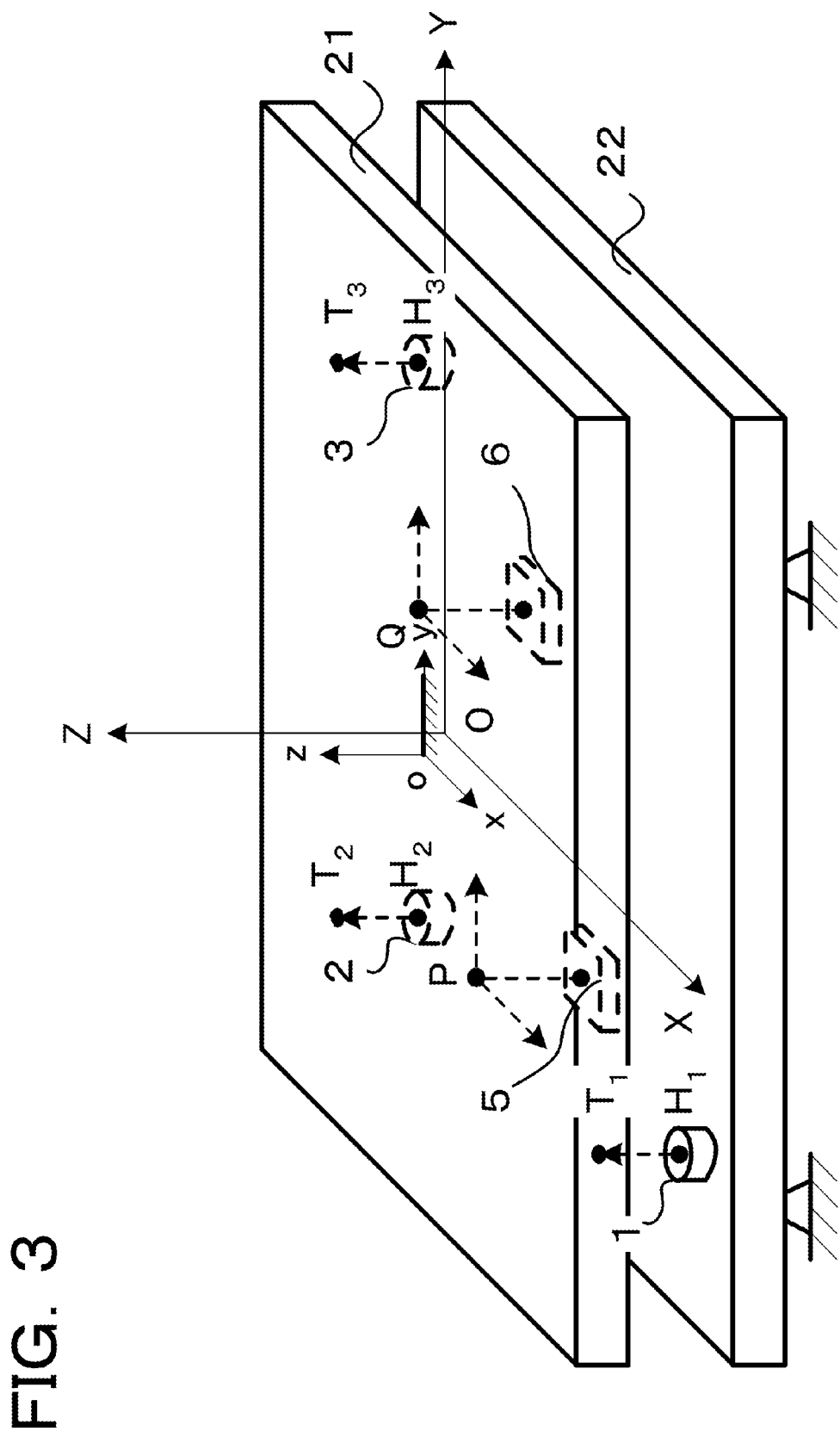
FIG. 3 is a diagram of a first sensor configuration of the multi-degree-of-freedom stage control apparatus according to the embodiment.

In FIG. 3, reference numeral 22 denotes a stator, and is a sensor reference position that is not moved and is fixed. Reference 21 denotes a moving element and is a control object that moves with respect to the stator 22. The multi-degree-of-freedom stage control apparatus not shown is an apparatus that controls the position or the posture of the moving element 21 with respect to the stator 22. Reference numerals 1 to 3 denote gap sensors, and the gap sensors measure positions of three points in Z axis direction. Reference numerals 5 and 6 denote two dimensional sensors and the two dimensional sensors measure moving distances in X axis direction and Y axis direction of tow points. That is, the position is obtained from the information of the two points in X axis direction, two points in Y axis direction, and three points in Z axis direction.

Figure 4:
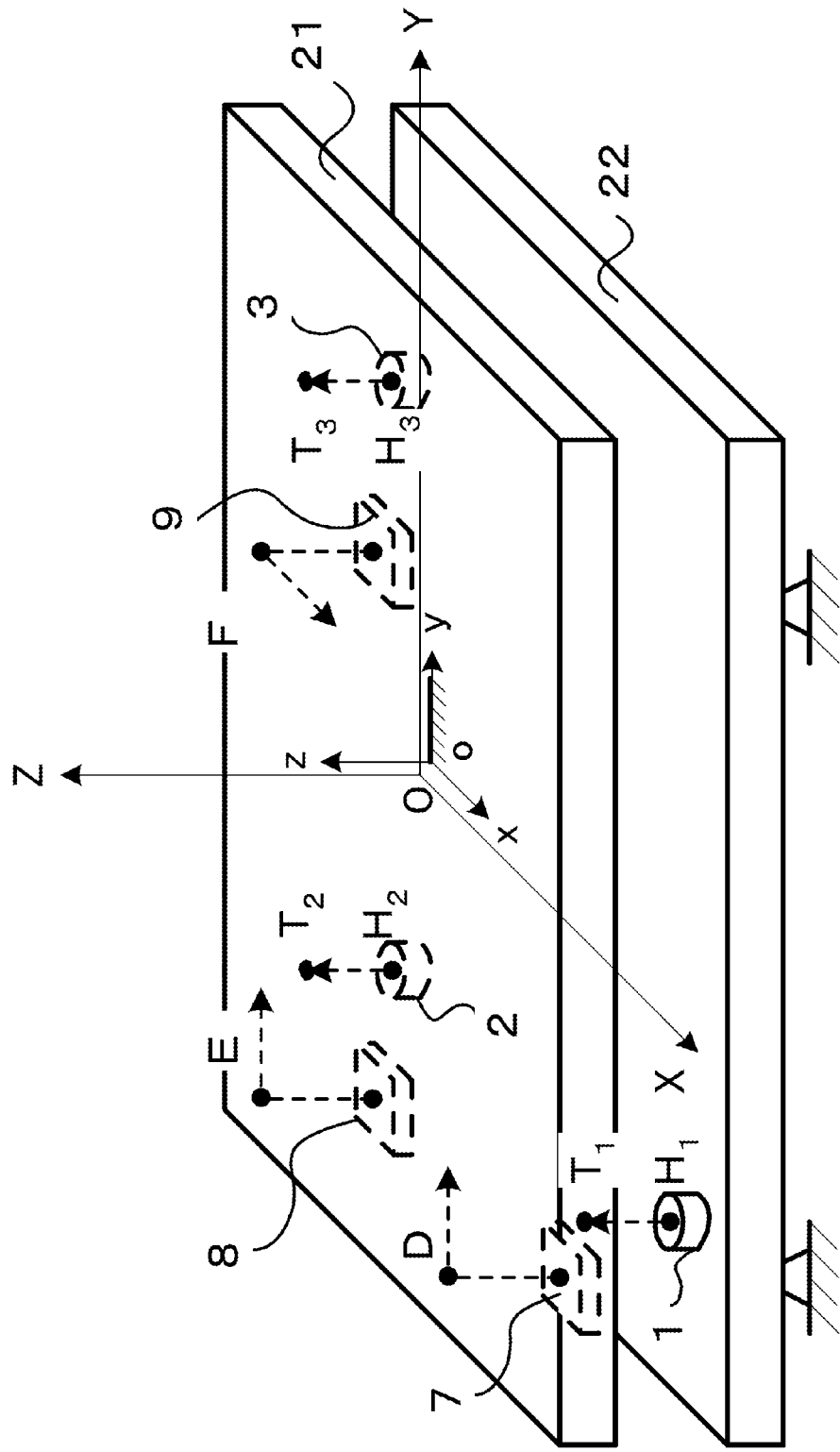
FIG. 4 is a diagram of a second sensor configuration of the multi-degree-of-freedom stage control apparatus according to the embodiment.

In FIG. 4, reference numerals 1 to 3 denote gap sensors, and the gap sensors measure positions of three points in Z axis direction. Reference numerals 7 to 9 denote displacement sensors, and the displacement sensors measure moving distances of two points in Y axis direction, and a moving distance of one point in X axis direction. That is, the position is obtained from information of one point in X axis direction, two points in Y axis direction, and thee points in Z axis direction.

Figure 5:
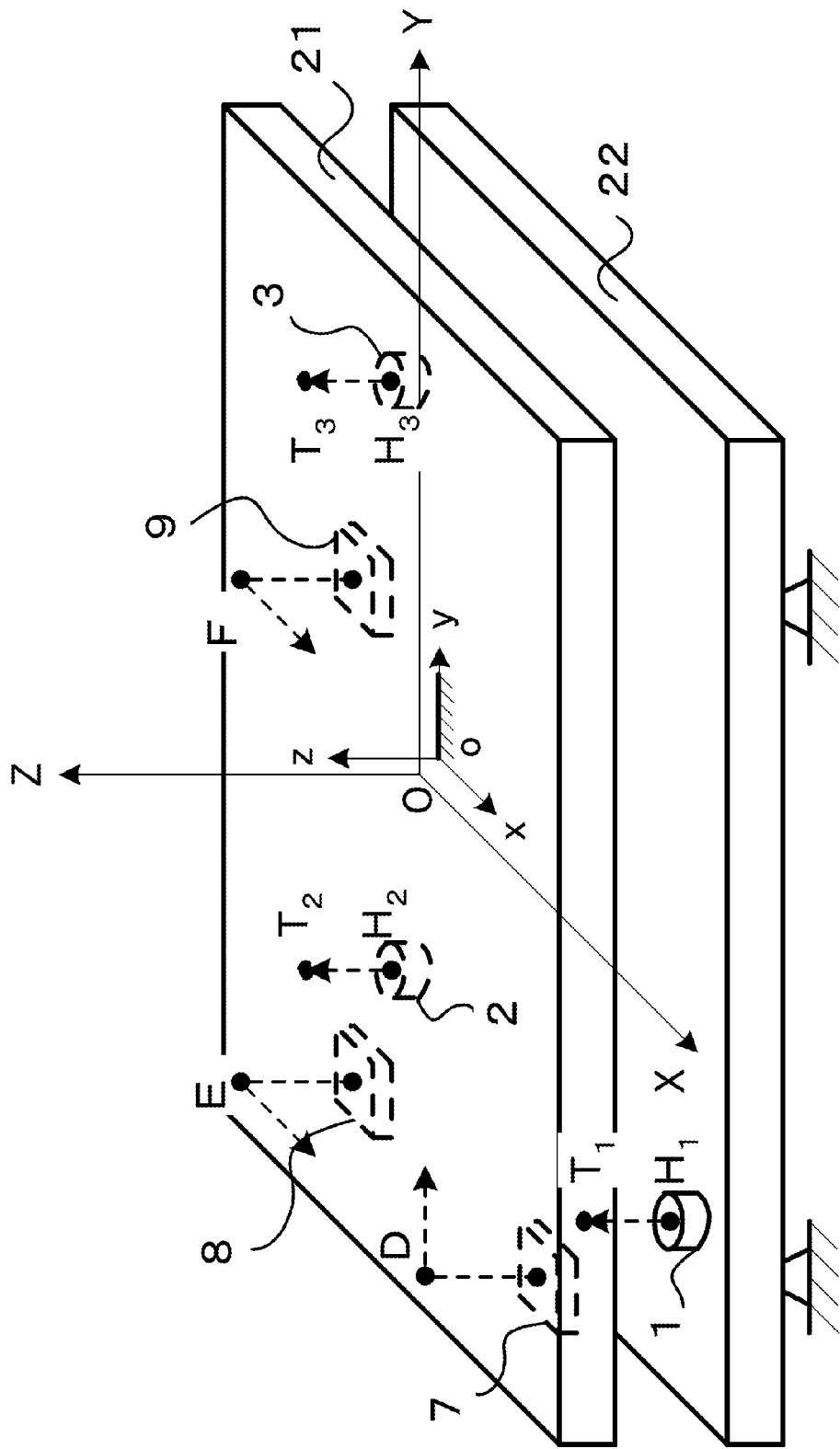
FIG. 5 is a diagram of a third sensor configuration of the multi-degree-of-freedom stage control apparatus according to the embodiment.

In FIG. 5, reference numerals 1 to 3 denote gap sensors, and the gap sensors measure positions of three pints in Z axis direction. Reference numerals 7 to 9 denote displacement sensors, and the displacement sensors measure moving distances of two points in X axis direction and a moving distance of one point in Y axis direction. That is the position is obtained from information of two points in X axis direction, one pint in Y axis direction, and three points in Z axis direction.

Figure 6:
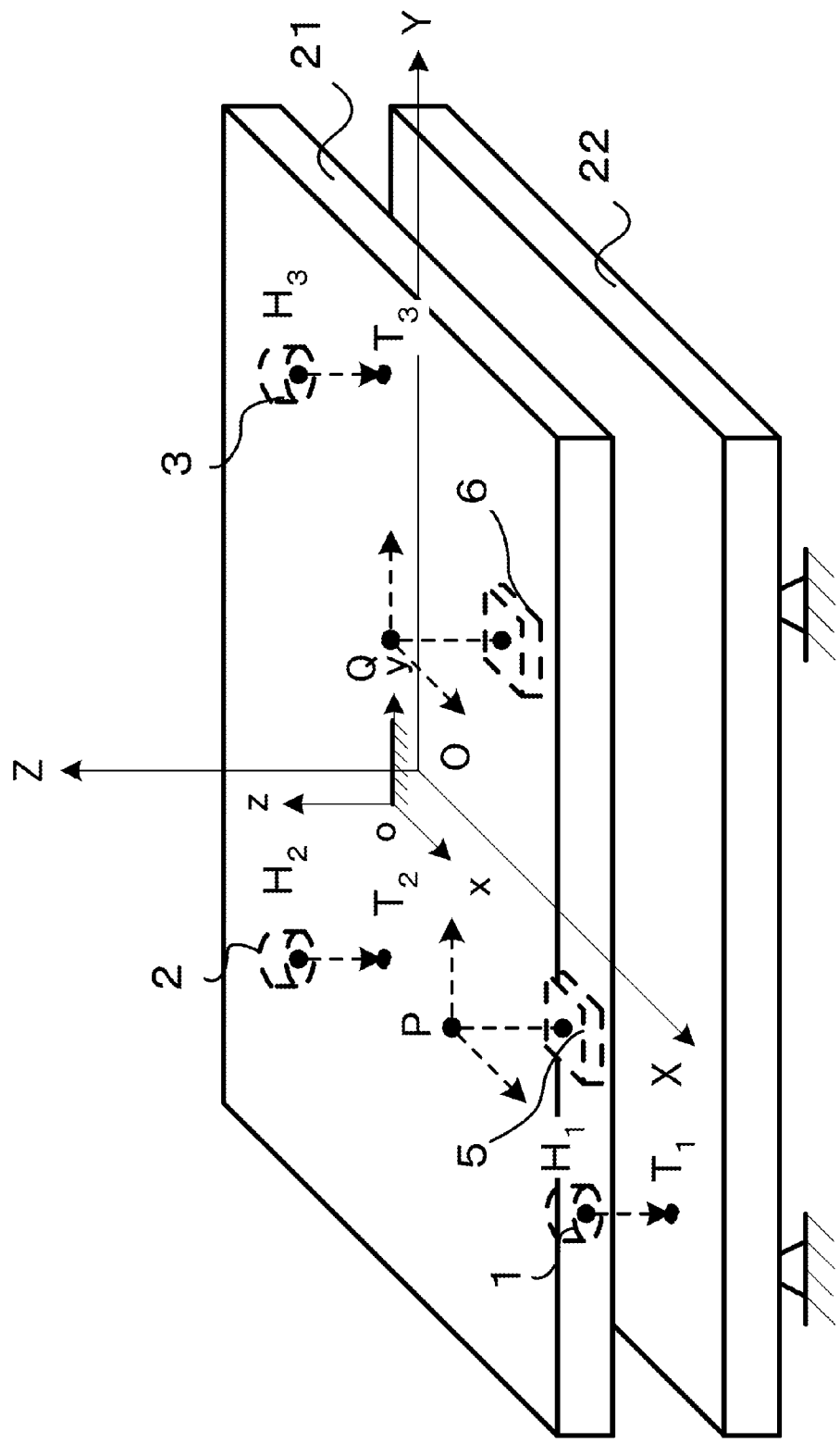
FIG. 6 is a diagram of a forth sensor configuration of the multi-degree-of-freedom stage control apparatus according to the embodiment.

In FIG. 6, reference numerals 1 to 3 denote gap sensors, and the gap sensors measure positions of three points in Z axis direction. Reference numerals 5 and 6 denote two dimensional sensors, and the two dimensional sensors measure moving distances of two points in X axis direction and Y axis direction. That is, the position is obtained from the information of two points in X axis direction, two pints in Y axis direction, and three pints in Z axis direction. However, in FIG. 3, sensor heads of the gap sensors 1 to 3 are located at the stator side and targets are located at the moving element side, whereas head sensors are located at the moving element side and targets are located at the stator side in FIG. 6.

Figure 7:
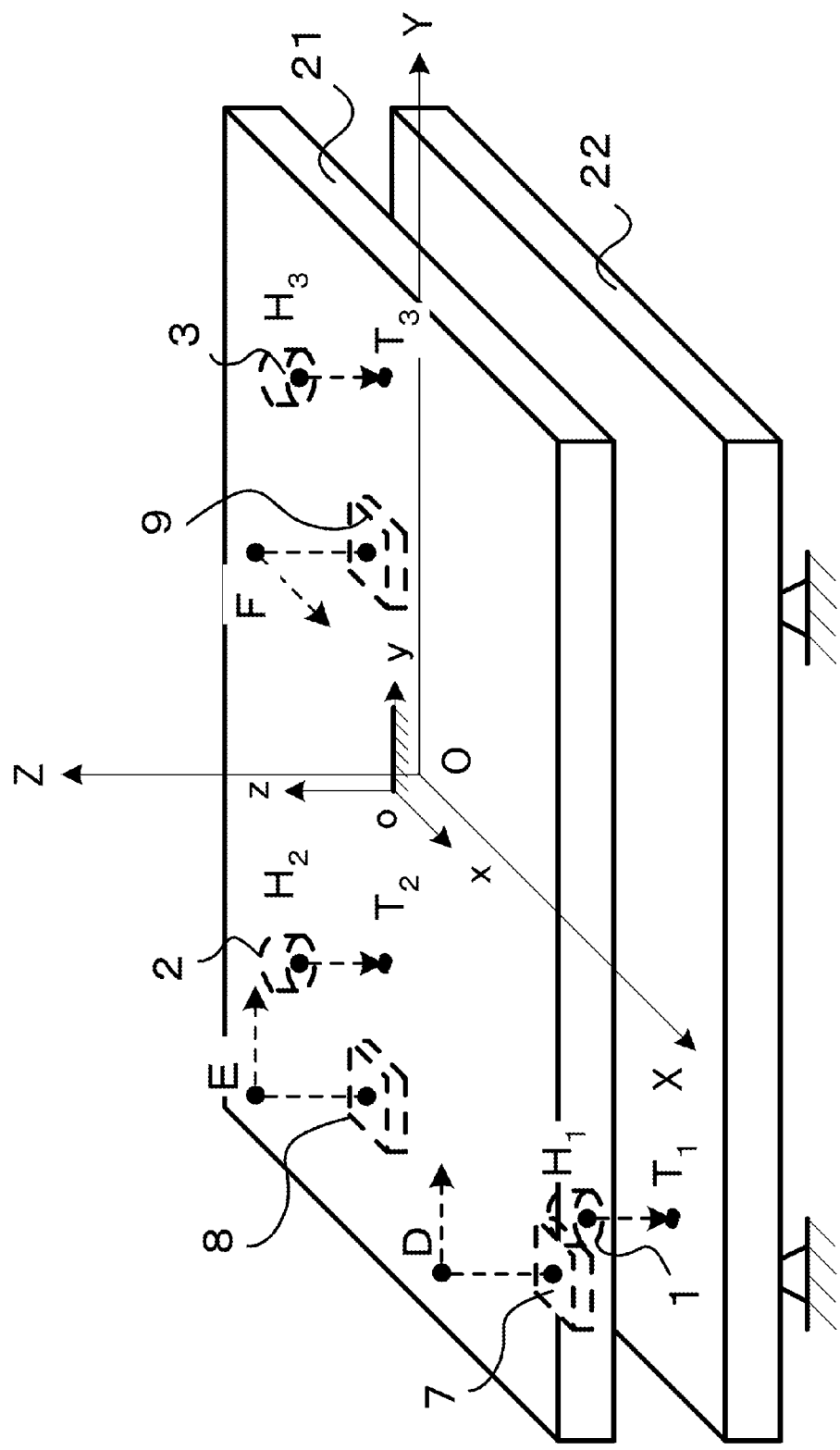
FIG. 7 is a diagram of a fifth sensor configuration of the multi-degree-of-freedom stage control apparatus according to the embodiment.

In FIG. 7, reference numerals 1 to 3 denote gap sensors, and the gap sensors measure positions of three points in Z axis direction. Reference numerals 7 to 9 denote displacement sensors, and the displacement sensors measure moving distances of two points in Y axis direction and one point in X axis direction. That is, the position is obtained from the information of one point in X axis direction, two pints in Y axis direction, and three pints in Z axis direction. However, in FIG. 4, sensor heads of the gap sensors 1 to 3 are located at the stator side and targets are located at the moving element side, whereas sensor heads are located at the moving element side and targets are located at the stator side in FIG. 7.

Figure 8:
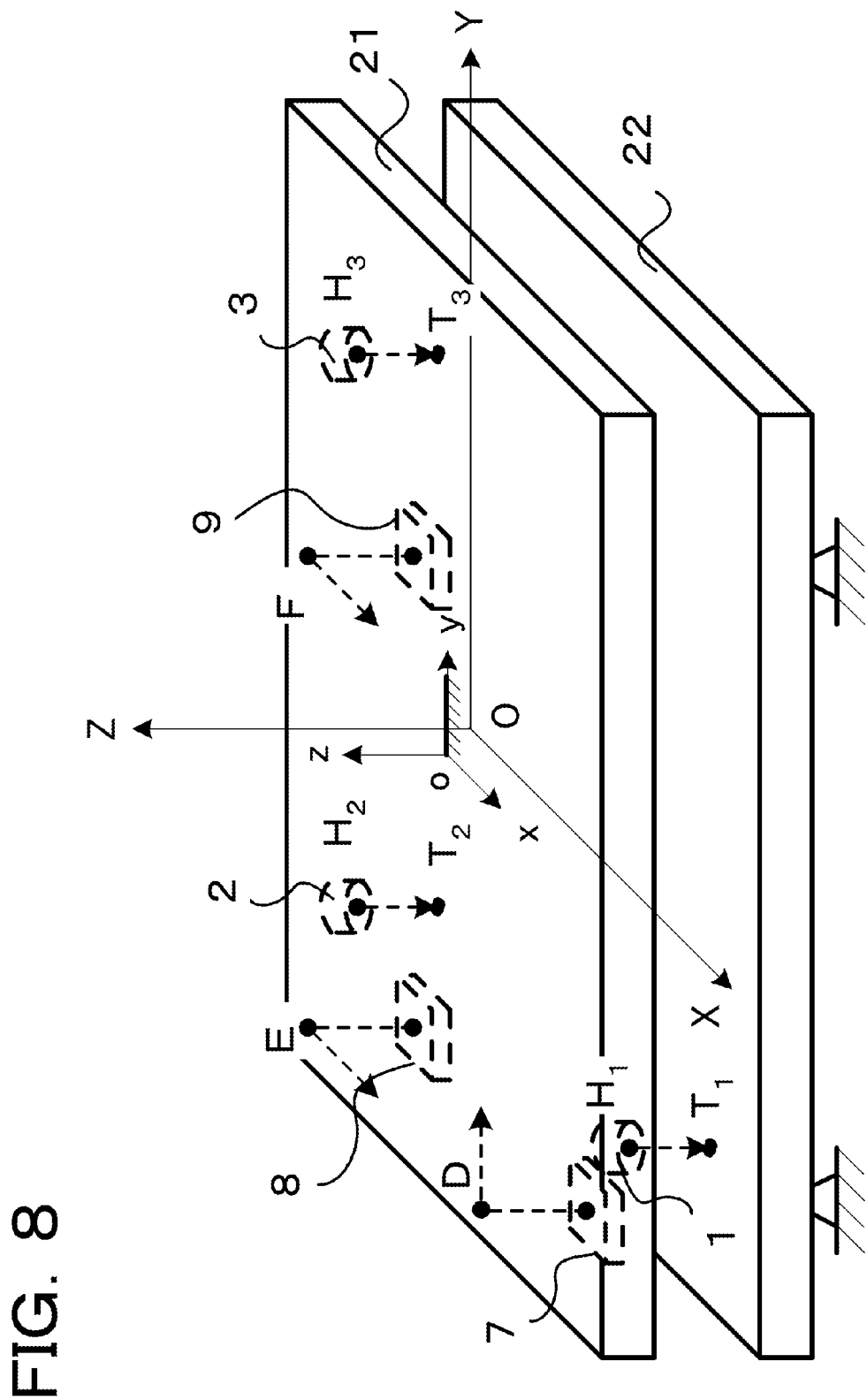
FIG. 8 is a diagram of a sixth sensor configuration of the multi-degree-of-freedom stage control apparatus according to the embodiment.

In FIG. 8, reference numerals 1 to 3 denote gap sensors, and the gap sensors measure positions of tree points in Z axis direction. Reference numerals 7 to 9 denote displacement sensors, and the displacement sensors measure moving distances of two points in X axis direction and one point in Y axis direction. That is, the position is obtained from the information of two pint in X axis direction, one point in Y axis direction, and three points in Z axis direction. However, in FIG. 5, sensor heads of the gap sensors 1 to 3 are located at the stator side and targets are located at the moving element side, whereas sensor heads are located at the moving element side and targets are located at the stator side in FIG. 8.

Figure 9:
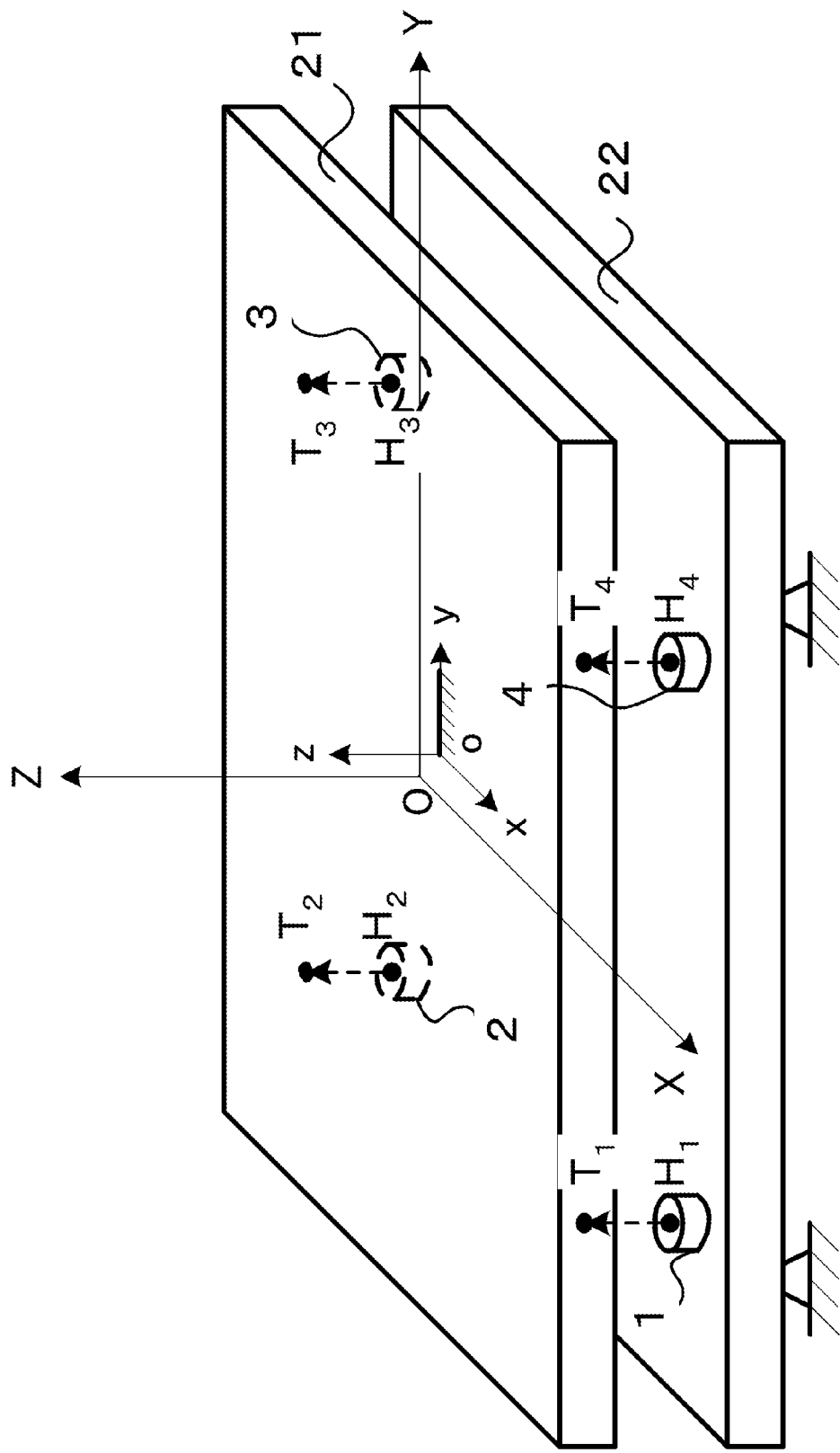
FIG. 9 is a diagram of a seventh sensor configuration of the multi-degree-of-freedom stage control apparatus according to the embodiment.

In FIG. 9, reference numerals 1 to 4 denote gap sensors, and measure positions of four points in Z axis direction. That is, the position is obtained from the information of four points in Z axis direction.

Figure 10:
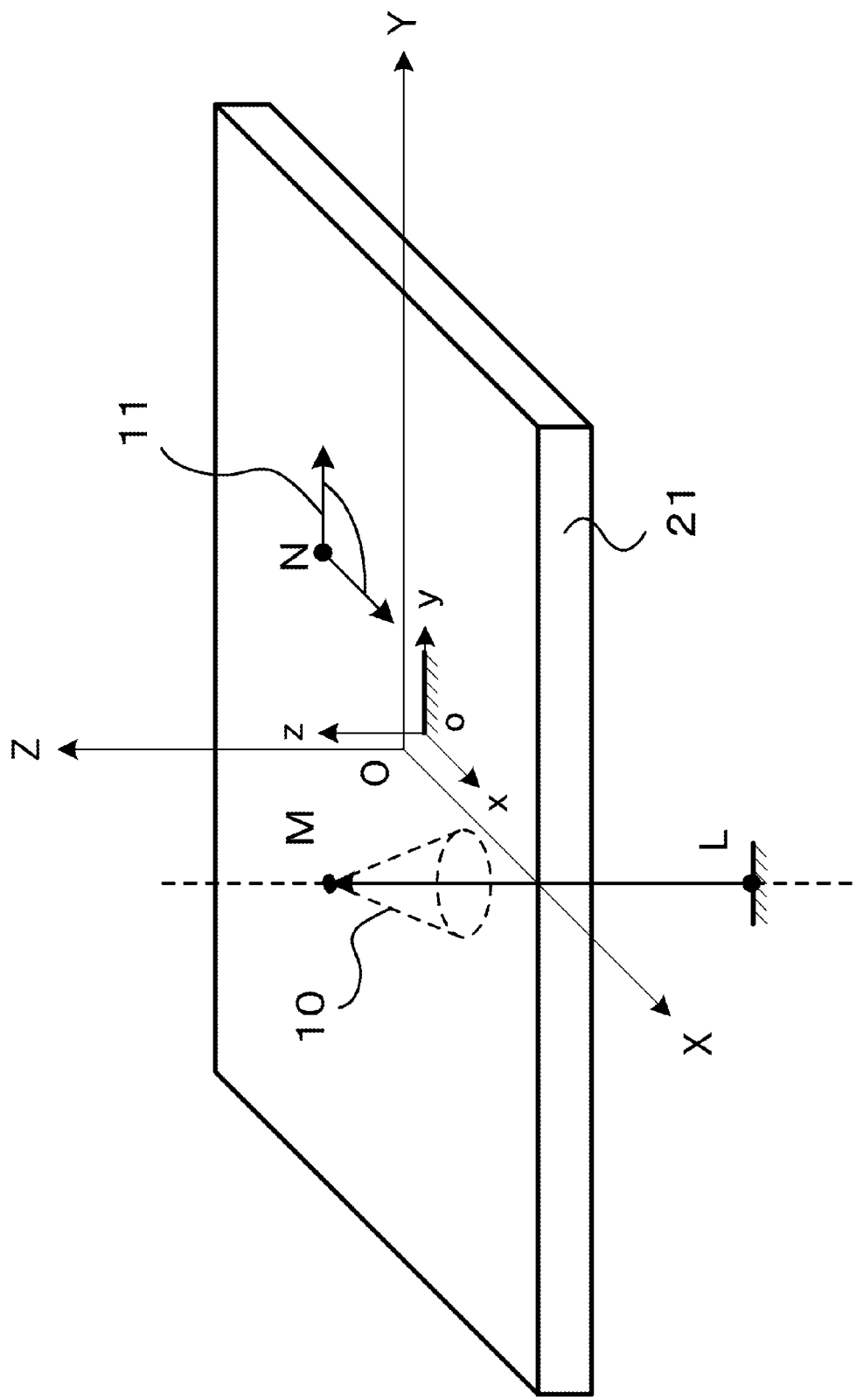
FIG. 10 is a diagram of an eighth sensor configuration of the multi-degree-of-freedom stage control apparatus according to the embodiment.

In FIG. 10, reference numeral 10 denotes a three dimensional sensor, and measures a position in Z axis direction, a rolling angle, and a pitching angle of one point. Reference numeral 11 denotes a three dimensional sensor, and measures a position in X axis direction, a position in Y axis direction, and a yawing angle of one point.

In this manner, the multi-degree-of-freedom stage control apparatus includes the sensor configuration input device and the actuator configuration input device and has the structure in which the thrust force arithmetic unit, the current instruction unit, the position arithmetic unit, and the sensor signal convertor are varied. Accordingly, the sensor configuration and the actuator configuration can be selected from among a plurality of sensor configurations and actuator configurations, and it becomes possible to enhance generality of the position arithmetic unit and the actuator thrust force conversion arithmetic unit, and the multi-degree-of-freedom stage control apparatus can be used for various control objects. Further, when it is difficult to cope with every sensor configuration and actuator configuration from the beginning, only arithmetic expressions of the sensor configuration and the actuator configuration that are mainly used may be stored in a memory, and another position arithmetic expression and thrust force conversion arithmetic expression may be added as a function when a corresponding sensor configuration or actuator configuration is added. Herewith, it becomes possible to, for example, deliver a new sensor configuration and an actuator configuration by a network as an additional update function.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A multi-degree-of-freedom stage control system comprising:
   a multi-degree-of-freedom stage structured by a plurality of actuators;
   an instruction generator for generating instructions of plural degrees of freedom;
   a position arithmetic unit for calculating positions of plural degrees of freedom from signals of a plurality of sensors attached to a control object,
   a control arithmetic unit for calculating operation amounts of plural degrees of freedom from the instructions of plural degrees of freedom and the positions of plural degrees of freedom;
   a thrust force conversion arithmetic unit for calculating thrust force instructions of the plurality of actuators from the operation amounts of the plural degrees of freedom;
   a current instruction unit for calculating current instructions which should be flowed to the plurality of actuators; and a sensor configuration input device for selecting a desired sensor configuration from among a plurality of sensor configurations, wherein the positions of plural degrees of freedom are calculated by using a position arithmetic expression corresponding to a selected sensor configuration.

2. The multi-degree-of-freedom stage control system according to claim 1, wherein the position arithmetic unit has position arithmetic expressions respectively corresponding to the plurality of sensor configurations in a memory in advance.

3. The multi-degree-of-freedom stage control system according to claim 1, wherein the position arithmetic unit has a function of adding position arithmetic expressions respectively corresponding to the plurality of sensor configurations later on as functions.

4. The multi-degree-of-freedom stage control system according to claim 1, wherein the sensor configuration input device has a sensor number input unit for inputting the number of sensor with respect to each of X axis, Y axis, and Z axis defined by a user.

5. The multi-degree-of-freedom stage control system according to claim 1, wherein the sensor configuration input device is equipped with a sensor position input unit for inputting a position coordinate of each sensor used in the selected sensor configuration.

6. The multi-degree-of-freedom stage control system according to claim 1, wherein the sensor configuration input device includes a sensor type input unit for inputting the type of each sensor used in the selected sensor configuration.

7. The multi-degree-of-freedom stage control system according to claim 6, wherein the sensor type input unit is capable of selecting at least an absolute position sensor and a relative position sensor in which an activation position is zero.

8. The multi-degree-of-freedom stage control system according to claim 6, wherein the position arithmetic unit includes a zero position signal detector for detecting a zero position signal of a relative position sensor, and has a function of storing a sensor signal that is obtained when the zero position signal is detected.

9. A multi-degree-of-freedom stage control system comprising:

a multi-degree-of-freedom stage structured by a plurality of actuators;

an instruction generator for generating instructions of plural degrees of freedom;

a position arithmetic unit for calculating positions of plural degrees of freedom from signals of a plurality of sensors attached to a control object, a control arithmetic unit for calculating operation amounts of plural degrees of freedom from the instructions of plural degrees of freedom and the positions of plural degrees of freedom;

a thrust force conversion arithmetic unit for calculating thrust force instructions of the plurality of actuators from the operation amounts of the plural degrees of freedom;

a current instruction unit for calculating current instructions which should be flowed to the plurality of actuators; and an actuator configuration input device for selecting a desired actuator configuration from among a plurality of actuator configurations, wherein the thrust force instructions of the plurality of actuators are calculated by using a thrust force conversion arithmetic expression corresponding to a selected actuator configuration.

10. The multi-degree-of-freedom stage control system according to claim 9, wherein the thrust force conversion arithmetic unit has thrust force conversion arithmetic expressions respectively corresponding to the plurality of actuator configurations in a memory in advance.

11. The multi-degree-of-freedom stage control system according to claim 9, wherein the thrust force conversion arithmetic unit has a function of adding thrust force conversion arithmetic expressions respectively corresponding to the plurality of actuator configurations later on as functions.

12. The multi-degree-of-freedom stage control system according to claim 9 wherein, the actuator configuration input device has an actuator number input unit for inputting the number of actuator with respect to each of X axis, Y axis, and Z axis defined by a user.

13. The multi-degree-of-freedom stage control system according to claim 9, wherein the actuator configuration input device has an actuator position input unit for inputting a position coordinate of each actuator used in the selected actuator configuration.

14. The multi-degree-of-freedom stage control system according to claim 9, wherein the actuator configuration input device has an actuator type input unit for inputting the type of each actuator used in the selected actuator configuration.

* * * * *